United States Patent
Reichert et al.

(10) Patent No.: US 6,821,314 B1
(45) Date of Patent: Nov. 23, 2004

(54) CAPACITOR POWDER

(75) Inventors: Karlheinz Reichert, Wolfenbüttel-Halchter (DE); Oliver Thomas, Harzburg (DE); Christoph Schnitter, Holle-Sottrum (DE)

(73) Assignee: H. C. Starck GmbH, Goslar (DE)

( * ) Notice: Subject to any disclaimer, the term of this patent is extended or adjusted under 35 U.S.C. 154(b) by 0 days.

(21) Appl. No.: 10/129,536

(22) PCT Filed: Oct. 27, 2000

(86) PCT No.: PCT/EP00/10622

§ 371 (c)(1),
(2), (4) Date: May 7, 2002

(87) PCT Pub. No.: WO01/35428

PCT Pub. Date: May 17, 2001

(30) Foreign Application Priority Data

Nov. 9, 1999 (DE) .......................... 199 53 946

(51) Int. Cl.⁷ ................................ B22F 1/00
(52) U.S. Cl. .................. 75/255; 428/570; 361/500; 427/217
(58) Field of Search ................ 75/255; 428/570; 361/500; 427/217

(56) References Cited

U.S. PATENT DOCUMENTS

| 3,684,929 | A | * | 8/1972 | Leifield | 361/529 |
| 3,849,124 | A | | 11/1974 | Villani | 75/177 |
| 3,867,129 | A | | 2/1975 | Ronneau et al. | 75/0.55 BB |
| 3,976,435 | A | * | 8/1976 | Klein | |
| 3,986,869 | A | * | 10/1976 | Oishi et al. | |
| 4,338,354 | A | * | 7/1982 | Bush et al. | 427/80 |
| 4,973,526 | A | * | 11/1990 | Haluska | 428/697 |
| 5,034,857 | A | | 7/1991 | Wong | |
| 5,914,417 | A | | 6/1999 | Reichert et al. | 556/42 |
| 6,051,326 | A | * | 4/2000 | Fife | 428/610 |
| 6,136,062 | A | | 10/2000 | Löffelholz et al. | 75/369 |
| 6,231,689 | B1 | | 5/2001 | Fife | |
| 6,282,419 | B1 | | 8/2001 | Findikli | 455/434 |

FOREIGN PATENT DOCUMENTS

| DE | 198 31 280 | 1/2000 |
| EP | 0 582 844 | 2/1994 |
| GB | 2106938 | 4/1983 |
| WO | 98/19811 | 5/1998 |

* cited by examiner

Primary Examiner—Ngoclan T. Mai
(74) Attorney, Agent, or Firm—Joseph C. Gil; Diderico van Eyl

(57) ABSTRACT

An electrolyte capacitor containing a niobium anode, a niobium oxide barrier layer, a semiconducting cathode and an electrolyte is described, where the niobium oxide barrier comprises a least one metal from the group consisting of Al, Si, Ti, Zr, Mo, W, Y and Ta.

8 Claims, 1 Drawing Sheet

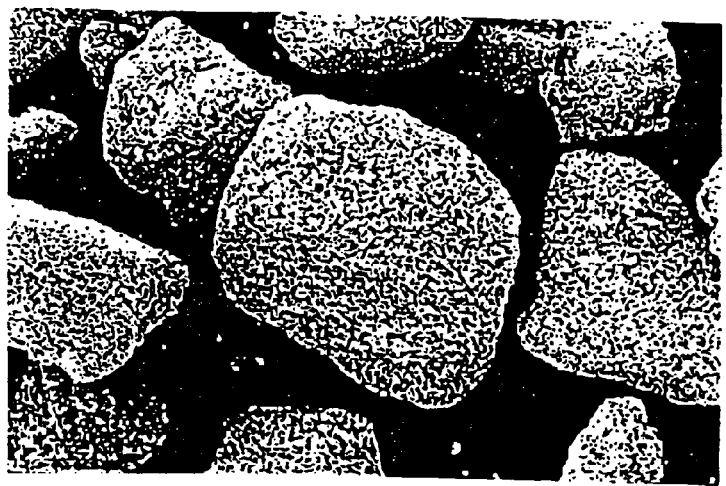
00015864  ⊢—⊣ 100μm  HCST
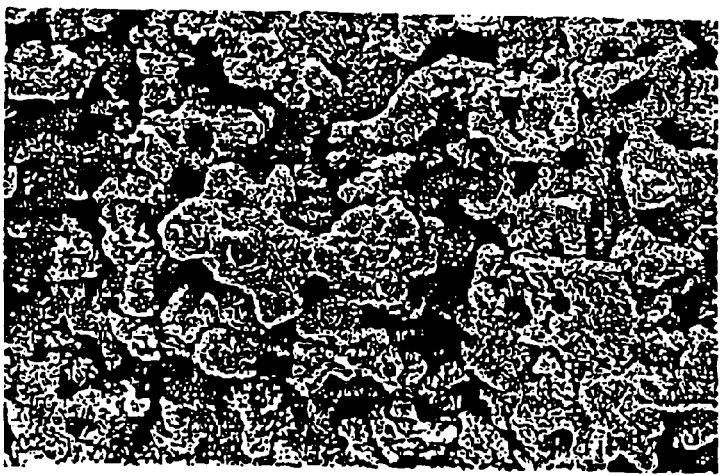
00015865  ⊢—⊣ 10μm  HCST
00015866  ⊢—⊣ 3μm  HCST

CAPACITOR POWDER

This application is the National Stage Application of PCT/EP00/10622, which claims a priority from German Application 19953946.4 Nov. 9, 1999.

The present invention relates to a powder for the production of electrolyte capacitors, especially a powder for the production of anodes for electrolyte capacitors.

The literature describes, in particular, the earth acid metals niobium and tantalum as starting materials for the production of capacitors of this type. The capacitors are produced by sintering the finely divided powder to produce a structure having a large surface area, oxidizing the surface of the sintered body to produce a non-conducting insulating layer, and applying the counterelectrode in the form of a layer of manganese dioxide or a conductive polymer. The particular suitability of the earth acid metal powders is derived from the large relative dielectric constants of the pentoxides.

Only tantalum powders have hitherto achieved industrial importance for the production of capacitors. This is due firstly to the ability to produce finely divided tantalum powder reproducibly, and secondly to the fact that the insulating oxide layer of tantalum pentoxide has particularly pronounced stability. This may be due to the fact that tantalum, in contrast to niobium, does not form a stable suboxide.

In the course of development of microelectronics, however, disadvantages of tantalum are increasing in importance. Firstly, tantalum has a very high density of 16.6 g/cm$^3$. This limits the trend toward weight reduction, in particular of portable electronic equipment, such as mobile telephones, etc. Since the density of niobium is only half that of tantalum, approximately double the specific capacitance per unit weight can be achieved compared with tantalum powders, under the prerequisite of the same geometry and same properties of the oxide layer. The material properties of the insulating pentoxide layer which determine the capacitance of a capacitor have partially contradictory influences in the case of niobium on the one hand and in the case of tantalum on the other hand.

Thus, the capacitance of a capacitor is higher, the higher the relative dielectric constant of the insulator layer. It is lower, the thicker the insulator layer thickness necessary for the specified operating voltage in each case. Thus, the dielectric constant of niobium pentoxide, which, at 41, is higher than that of tantalum pentoxide, which is 26, is compensated by the greater thickness of the pentoxide layer necessary in the case of niobium compared with tantalum. For a pre-specified anodization voltage, the increase in thickness of the tantalum pentoxide layer is about 2 nm/V and that of the niobium pentoxide layer is about 3.7 nm/V. The capacitances based on the surface area of the capacitors are accordingly comparable.

The use of niobium capacitors has hitherto been restricted to the area of low specific capacitances with small specific surface areas and relatively low quality.

The object of the present invention is to overcome the disadvantages of the known niobium capacitors. In particular, it is an object of the present invention to improve the niobium pentoxide barrier layer in niobium capacitors in such a way that higher specific capacitances can be achieved.

It has been found that niobium powders having a surface coating of at least one of the elements Al, Si, Ti, Zr, Mo, W, Y and Ta are highly suitable for the production of niobium capacitors. In particular, it has been found that the specific capacitance, based on the surface area of the capacitor anode, of capacitors of this type produced from coated niobium powder is higher than that of pure niobium anodes and that niobium anodes with low residual current are obtained. Furthermore, first indications of a long-stability which is comparable with that of tantalum anodes are present.

The present invention accordingly relates to niobium powders having a surface coating of at least one of the elements Al, Si, Ti, Zr, Mo, W, Y and Ta.

The invention also relates to sintered anodes consisting of niobium for capacitors, where the anodes have a surface content of at least one of the elements Al, Si, Ti, Zr, Mo, W, Y and Ta.

The invention furthermore relates to sintered anodes of niobium which have been provided with a niobium oxide barrier layer, where the barrier layer has a content of at least one of the elements Al, Si, Ti, Zr, Mo, W, Y and Ta.

The invention furthermore relates to electrolyte capacitors which consist of a niobium anode, a niobium oxide barrier layer, a semiconducting cathode and an electrolyte, where the niobium oxide barrier layer has at least one of the surface modification elements.

Preferred contents of the surface modification elements in the barrier layer are less than 25 atom-%, based on the total metal content of the barrier layer, particularly preferably up to 20 atom-%. Preference is furthermore given to contents of the surface modification element of from 2 to 15 atom-% in the oxide barrier layer.

Based on the niobium powder, the amount of surface coating is preferably less than 18 atom-%, in particular less than 15 atom-%, further preferably from 1.5 to 12 atom-%.

Preferred surface modification elements are Ti, Zr and Ta, particularly preferably Ta.

It is assumed that the surface modification element of the niobium powder essentially remains on the surface even during further conversion into the capacitor, since the temperatures of, usually, below 1250° C. that are used during further conversion are relatively low for solid-state diffusions relative to the melting point of niobium of 2500° C.

Accordingly, the present invention makes it possible to produce niobium capacitors which exceeds the highest-capacitance tantalum capacitors that are currently available. Tantalum capacitors of this type have specific capacitances of 100,000 $\mu$FV/g at anodization voltages of, for example, 40 V. A niobium capacitor according to the invention with corresponding geometry has specific capacitances of greater than 300,000 $\mu$FV/g. In particular, chemically modified niobium capacitors which have a specific capacitance, based on the capacitor area, of greater than 60,000 $\mu$FV/m$^2$, in particular greater than 70,000 $\mu$FV/m$^2$, are successfully produced.

The invention also relates to the process for the production of the capacitor powders according to the invention. The process comprises soaking a niobium powder in the solution of a hydrolyzable or decomposable compound of the surface modification element, separating the powder off from the solution, hydrolyzing or decomposing the compound adhering to the powder, and subsequently reducing the hydrolyzate to the metal.

Suitable niobium powders are powders which have been obtained by heating niobium metal ingots melted by means of an electron beam in a hydrogen atmosphere, grinding the material, which has been rendered brittle through hydrogen absorption, and removing the hydrogen by heating under reduce pressure. Niobium flakes in accordance with WO 98/19811 are also suitable.

Also suitable are highly porous niobium powders which have been obtained in accordance with proposals by the Applicant in accordance with DE 198 31 280, DE 198 47 012 and PCT 99/09772, which are not prior publications, by the reduction of niobium pentoxide in liquid or gaseous magnesium, if desired after prior reduction to the suboxide by means of hydrogen.

Further suitable niobium powders are niobium powders which comprise one or more of the elements Al, Ti, Mo, W, Hf, Zr or Ta as alloy constituents, i.e. in uniform distribution in amounts of up to 5% by weight.

The application of the surface modification element is described below using the example of tantalum:

Suitable decomposable or hydrolyzable tantalum compounds are, in particular, organic tantalum compounds which are soluble in water or organic solvents. A suitable water-soluble organic tantalum compound is tantalum oxalate. The alcohol-soluble tantalum alkoxides having from 1 to 8 carbon atoms, such as tantalum methoxide, tantalum ethoxide, tantalum propoxide, tantalum butoxide, etc., including tantalum octanoates, are also suitable, furthermore also organometallic compounds of tantalum in accordance with U.S. Pat. No. 5,914,417.

In order to produce the thin tantalum layers on the niobium powder, the organic tantalum compounds are preferably employed in dilute solutions, so long as these are still liquid per se. A suitable solvent is water so long as the tantalum compound is water-stable. The alkoxides are preferably employed in absolute alcohol or in other organic solvents having such low acidity that hydrolysis does not occur without ingress of water, such as toluene or benzene. The alkoxides are preferably dissolved using the respective corresponding alcohol.

The concentration of the tantalum compound in the respective solvent is preferably from 1 to 20% by weight, particularly preferably from 1 to 10% by weight and further preferably from 1 to 5% by weight.

The niobium powder is suspended in the solution of the organic tantalum compound and, in order to ensure good wetting, left to stand for some time. This can typically be from 10 minutes to 1 hour. In order to ensure good penetration of the porous niobium powder or niobium powder agglomerates, it may be advantageous to set the niobium powder under reduced pressure in a vacuum container, if desired to flush the container with solvent vapors, and subsequently to feed the treatment solution into the evacuated vessel.

The treated niobium powder can be separated from the solution by filtration, centrifugation or decantation.

In the case of the use of tantalum alkoxides, these are carefully hydrolyzed in air without exclusion of moisture or in moistened air, preferably with gentle warming to from 50 to 100° C. If desired, steam can be passed in towards the end of the treatment in order to complete the hydrolysis. In the case of the use of tantalum oxalate, the hydrolysis is carried out in an aqueous alkaline solution, for example an ammonia solution or sodium hydroxide solution. The hydrolysis is particularly preferably carried out in an ammonia-containing stream of gas.

In order to produce a uniformly adherent tantalum oxide coating, the hydrolysis should take place gradually over the course of a number of hours.

The immersion and hydrolysis can be repeated a number of times. It is preferred to carry out the immersion of the niobium powder in solutions of relatively low concentration, but to do so a number of times.

After any interim drying step, the niobium powder treated in this way is preferably reduced using a getter metal of adequately high vapor pressure at from 850 to 1000° C. Suitable getter metals are: magnesium, calcium, strontium, barium, aluminum and/or lanthanum. It is essential that the oxides forming during the reduction can easily be washed out using mineral acids. A particularly preferred reducing agent is magnesium.

The niobium powders reduced in this way, washed with mineral acids and subsequently washed with demineralized water until free from acid and dried are pressed in suitable molds to a pressing density of from 2.5 to 3.5 g/cm$^3$ to give pellets and subsequently sintered in a manner known per se at from 1100 to 1250° C. The sintered anodes are provided with a tantalum and/or niobium, preferably niobium, wire contact so long as the contact wire has not already been inserted into the mold during pressing.

The anodes are subsequently activated to the desired activation voltage in a known manner in 0.1% strength phosphoric acid.

Apart from the oxalates and alkoxides, aqueous solutions of ammonium paratungstate are suitable and preferred for the production of tungsten coatings and aqueous solutions of ammonium heptamolybdate, which are thermally decomposable, are suitable and preferred for the production of molybdenum coatings.

Suitable for the production of titanium coatings is an aqueous solution of $TiOSO_4$, which is hydrolyzed by means of an aqueous base, for example ammonia, or pure $TiCl_4$, which is subsequently hydrolyzed using steam.

EXAMPLES 1 to 7

A high-purity niobium powder obtained by magnesium vapor reduction of niobium suboxide $NbO_2$ in accordance with DE-A 19 831 280 is employed. The powder has a specific BET surface area of 3.02 m$^2$/g. Various amounts of sample are immersed in an ethanol solution containing the amount of tantalum ethoxide indicated in Table 1. A comparative sample is treated in pure ethanol solution. After 30 minutes, the amounts of sample are separated off from the respective solution by filtration and left to stand in ambient air for 15 minutes.

The samples are subsequently dried at 95° C. for 45 minutes, washed with demineralized water at 80° C. and re-dried.

The samples are then reduced under an argon atmosphere using magnesium vapor at from 850° C. to 950° C. (temperature gradient in the oven).

FIG. 1 shows an SEM photomicrograph of sample 1 in accordance with Table 1 at various magnifications.

The analytical values for Ta, C, H and O and the specific surface area of the samples are shown in Table 1.

The samples are pressed in a conventional manner around a niobium wire at a pressing density of 3.14 g/cm$^3$ to give anode pellets and sintered at 1150° C. for 20 minutes. The sintered anodes are activated to an activation voltage of 40 V in 0.1% strength phosphoric acid.

The capacitor properties are determined in 30% strength sulfuric acid as catholyte at a bias voltage of 1.5 V.

The results are shown in Table 1.

TABLE 1

| Sample | Immersion in ethanol % by wt. Ta(OEt)5 | Powder | | | | | Capacitor | | |
|---|---|---|---|---|---|---|---|---|---|
| | | Ta ppm | C ppm | H ppm | O ppm | S. A.[1) ] m$^2$/g | CV/g μFV/g | CV/m$^2$ μ-FV/m$^2$ | I$_r$/CV nA/μFV |
| Comparison | 0 | 21 | 98 | 68 | 4100 | 1.03 | 63240 | 61400 | 0.95 |
| Ex. 1 | 1 | 1640 | 103 | 67 | 3900 | 0.93 | 69200 | 74400 | 1.08 |
| Ex. 2 | 5 | 2490 | 143 | 69 | 4200 | 1.00 | 73700 | 73700 | 0.58 |
| Ex. 3 | 10 | 13900 | 224 | 78 | 5209 | 1.15 | 81100 | 70500 | 0.77 |
| Ex. 4 | 5 (3 times) | 14700 | 196 | 84 | 5180 | 1.1 | 82200 | 74700 | 0.61 |
| Ex. 5 | 20 | 27200 | 275 | 112 | 5528 | 1.55 | 91700 | 59200 | 0.67 |
| Ex. 6 | 5 (6 times) | 29600 | 267 | 108 | 4800 | 1.05 | 84300 | 80300 | 0.76 |
| Ex. 7 | 5 (8 times) | 42300 | 248 | 121 | 4430 | 0.98 | 83900 | 85600 | 0.69 |

[1)] BET

What is claimed is:

1. An electrolyte capacitor comprising:
   (a) a niobium anode,
   (b) a niobium oxide barrier layer,
   (c) a semiconducting cathode and an electrolyte,
   wherein the niobium oxide barrier layer comprises at least one metal selected from the group consisting of Al, Si, Ti, Zr, Y, Ta, and combinations thereof.

2. The capacitor according to claim 1, wherein the metal is tantalum.

3. A capacitor anode comprising a sintered niobium powder and a barrier layer produced by anodic oxidation, wherein the barrier layer comprises at least one of the elements selected from the group consisting of Al, Si, Ti, Zr, Y, Ta, and combinations thereof.

4. The capacitor anode of claim 3, wherein the anode consists of the sintered niobium powder with the barrier layer.

5. A capacitor powder comprising a niobium powder having a surface coating wherein the surface coating comprises at least one element selected from the group consisting of Al, Si, Ti, Zr, Y, Ta, and combinations thereof.

6. The capacitor powder of claim 5, wherein the capacitor powder consists essentially of the niobium powder having the surface coating.

7. A process for making a capacitor powder comprising a niobium powder having a surface coating of at least one element selected from the group consisting of Al, Si, Ti, Zr, Mo, W, Y, Ta, and combinations thereof, the process comprising:
   (a) soaking an optionally alloyed niobium powder in a solution of a hydrolyzable or decomposable compound selected from the group consisting of Al, Si, Ti, Zr, Mo, W, Y, Ta, and combinations thereof,
   (b) removing of the powder from the solution, wherein a compound adheres to the powder,
   (c) hyrolysing or decomposing the compound which adheres to the powder.

8. The process of claim 7, wherein the process further comprises reducing a hydrolyzate to a metal.

* * * * *